US011993501B2

(12) United States Patent
Nishino et al.

(10) Patent No.: US 11,993,501 B2
(45) Date of Patent: May 28, 2024

(54) FILLING METHOD

(71) Applicant: SHIBUYA CORPORATION, Kanazawa (JP)

(72) Inventors: Yukinobu Nishino, Kanazawa (JP); Taro Kitayama, Kanazawa (JP); Shinya Kamori, Kanazawa (JP); Mizuho Kiba, Kanazawa (JP); Yuichi Yonemura, Kanazawa (JP)

(73) Assignee: SHIBUYA CORPORATION, Kanazawa (JP)

( * ) Notice: Subject to any disclaimer, the term of this patent is extended or adjusted under 35 U.S.C. 154(b) by 0 days.

(21) Appl. No.: 18/150,759

(22) Filed: Jan. 5, 2023

(65) Prior Publication Data

US 2023/0147368 A1 May 11, 2023

Related U.S. Application Data

(62) Division of application No. 17/178,189, filed on Feb. 17, 2021, now abandoned.

(30) Foreign Application Priority Data

Feb. 18, 2020 (JP) ................................. 2020-025650

(51) Int. Cl.
*B67C 3/28* (2006.01)

(52) U.S. Cl.
CPC .............. *B67C 3/283* (2013.01); *B67C 3/281* (2013.01)

(58) Field of Classification Search
CPC ....... B67C 3/283; B67C 3/281; B67C 7/0073; B67C 2003/228; B67C 2003/2677;
(Continued)

(56) References Cited

U.S. PATENT DOCUMENTS 3,736,966 A * 6/1973 Dichiara .................. B67C 3/26 141/286
4,124,043 A * 11/1978 Noguchi .................. B67C 3/08 141/39
(Continued)

FOREIGN PATENT DOCUMENTS

DE 19640673 4/1997
EP 1584601 10/2005
(Continued)

OTHER PUBLICATIONS

Extended European Search Report for corresponding EP Application No. 21157845.5-1017, Jul. 23, 2021.
(Continued)

*Primary Examiner* — Hemant Desai
*Assistant Examiner* — Mobeen Ahmed
(74) *Attorney, Agent, or Firm* — MORI & WARD, LLP

(57) ABSTRACT

A filling method includes storing liquid in a liquid tank; pressing a seal member of a filling head against a mouth of a vessel to seal the mouth; providing a liquid valve in a liquid passageway which connects an inside of the liquid tank to the vessel via the filling head; providing a gas valve in a gas passageway connecting a headspace of the liquid tank to the vessel via the filling head; providing a snifting valve in a snifting passage which connects the vessel to an outside via the filling head; detecting an amount of the liquid supplied to the vessel; and when the liquid is a non-fizzy liquid, opening the liquid valve to supply the liquid to the vessel while a compressor pressurizes the inside of the liquid tank, the gas valve is closed, the snifting valve is opened, and the mouth of the vessel is sealed.

7 Claims, 7 Drawing Sheets

(58) Field of Classification Search
CPC ..... B67C 2003/268; B67C 3/04; B67C 3/286; B67C 3/06; B67C 3/26; B67C 3/22; B67C 3/2637
See application file for complete search history.

(56) References Cited

U.S. PATENT DOCUMENTS

| | | | | |
|---|---|---|---|---|
| 4,688,608 A * | 8/1987 | Puskarz | B67C 3/34 | 141/57 |
| 6,076,567 A * | 6/2000 | Naecker | B67C 3/2617 | 141/147 |
| 6,817,386 B2 * | 11/2004 | Tsukano | B67C 3/281 | 141/54 |
| 7,464,732 B2 * | 12/2008 | Nishino | B67C 3/04 | 141/144 |
| 7,469,726 B2 * | 12/2008 | Clusserath | B67C 3/286 | 141/147 |
| 2002/0139434 A1 * | 10/2002 | Meheen | B67C 3/10 | 141/59 |
| 2003/0150517 A1 * | 8/2003 | Decarne | B67C 3/26 | 141/286 |
| 2004/0118479 A1 * | 6/2004 | Tsukano | B67C 3/281 | 141/57 |
| 2005/0241726 A1 * | 11/2005 | Clusserath | B67C 3/12 | 141/144 |
| 2006/0113002 A1 * | 6/2006 | Nishino | B67C 3/2614 | 141/144 |
| 2010/0037984 A1 * | 2/2010 | Hiroya | B67C 7/0073 | 141/37 |
| 2011/0005638 A1 * | 1/2011 | Jenne | B67C 3/2614 | 141/287 |
| 2013/0026665 A1 * | 1/2013 | Buosi | F25D 23/126 | 261/64.3 |
| 2013/0037973 A1 * | 2/2013 | Lavaque | B01F 23/2362 | 261/27 |
| 2013/0068344 A1 * | 3/2013 | Graffin | B67C 3/262 | 141/50 |
| 2013/0299044 A1 * | 11/2013 | Jenne | B67C 3/2614 | 141/293 |
| 2014/0096866 A1 * | 4/2014 | Jenne | B67C 3/06 | 141/46 |
| 2014/0305541 A1 * | 10/2014 | Jenne | B65B 3/18 | 141/46 |
| 2014/0366982 A1 * | 12/2014 | Clusserath | B67C 3/225 | 141/104 |
| 2015/0284234 A1 * | 10/2015 | Meinzinger | B67C 3/10 | 141/59 |
| 2017/0001848 A1 * | 1/2017 | DiCarlo | B67C 3/24 | |
| 2017/0158480 A1 * | 6/2017 | Bandini | B67C 3/225 | |
| 2017/0320717 A1 * | 11/2017 | Jones | B67C 3/008 | |
| 2019/0071295 A1 * | 3/2019 | Clüsserath | B67C 3/16 | |
| 2019/0152754 A1 * | 5/2019 | Nishino | B67C 3/281 | |
| 2019/0375621 A1 * | 12/2019 | Bandini | B67C 3/22 | |
| 2019/0375622 A1 * | 12/2019 | Hayakawa | A23L 2/46 | |
| 2019/0389710 A1 * | 12/2019 | Hayakawa | B67C 3/20 | |
| 2020/0002147 A1 * | 1/2020 | Jones | B67C 3/10 | |
| 2020/0017344 A1 * | 1/2020 | Mueller | B67C 3/286 | |
| 2020/0255275 A1 * | 8/2020 | Eda | B67C 7/0013 | |
| 2021/0261397 A1 * | 8/2021 | Hayakawa | B67C 3/08 | |

FOREIGN PATENT DOCUMENTS

| | | |
|---|---|---|
| EP | 3489191 | 5/2019 |
| JP | 3555184 B2 | 1/1996 |
| JP | 2014-019493 | 2/2014 |
| JP | 2019-094098 | 6/2019 |
| WO | WO 2019/245019 | 12/2019 |

OTHER PUBLICATIONS

Office Action with Form PTO-892 Notice of References Cited issued by the United States Patent and Trademark Office for the parent U.S. Appl. No. 17/178,189, Jun. 27, 2022.

Office Action with Form PTO-892 Notice of References Cited issued by the United States Patent and Trademark Office for the parent U.S. Appl. No. 17/178,189, Oct. 6, 2022.

Advisory Action issued by the United States Patent and Trademark Office for the parent U.S. Appl. No. 17/178,189, Dec. 9, 2022.

Chinese Office Action for corresponding CN Application No. 202110190048.3, Jun. 21, 2023 (w/ English machine translation).

Japanese Office Action for corresponding JP Application No. 2020-025650, Nov. 7, 2023 (w/ English machine translation).

* cited by examiner

14

14

FILLING METHOD

CROSS-REFERENCE TO RELATED APPLICATIONS

The present application is a divisional application of the U.S. patent application Ser. No. 17/178,189, filed on Feb. 17, 2021, which claims priority under 35 U.S.C. § 119 to Japanese Patent Application No. 2020-025650, filed on Feb. 18, 2020. The contents of these applications are incorporated herein by reference in their entirety.

BACKGROUND OF THE INVENTION

1. Field of the Invention

The present invention relates to a filling method.

2. Description of the Related Art

A liquid tank of the filling system is pressurized when filling carbonated drinks or fizzy drinks into a vessel and a gas phase portion of the liquid tank and a sealed vessel are connected via a gas passage such as a vent tube so that the pressure in the liquid tank and the vessel are kept equal while filling the liquid. On the other hand, the pressurization of the liquid tank is generally unnecessary when filling non-carbonated drinks or non-fizzy drinks. Nevertheless, when the filling system is applied to both non-carbonated drinks and carbonated drinks, the pressurization is necessary for discharging residual liquid remaining in the vent tube after rising there during the filling operation carried out for the previous vessel. Therefore, when a non-carbonated drink is filled in a pliable vessel, the vessel could be deformed by the pressure. Accordingly, non-carbonated drinks are filled from the liquid tank opened to the atmosphere and a snifting valve is opened when or before the gas passage is vented and the pressure inside the vessel is exposed to the atmosphere. Therefore, the liquid remaining inside the vent tube is discharged to the vessel and the next filling operation can proceed without pressurization, see Japanese Patent No. 3555184 Publication.

However, in the case of sterilized filling in which the vessel is filled in a sterile environment, the non-carbonated drink is filled from the pressurized liquid tank to prevent inflow of foreign matter. Therefore, as for the configuration of Japanese Patent Publication No. 3555184, in which the vessel is in communication with the liquid tank during the filling operation, the pressurized gas is supplied inside the sealed vessel so that the shape of a vessel composed of a pliable material could change when a liquid is filled therein.

SUMMARY OF THE INVENTION

According to one aspect of the present invention, a filling method includes storing liquid in a liquid tank; pressing a seal member of a filling head against a mouth of a vessel to seal the mouth of the vessel by the seal member; providing a liquid valve in a liquid passageway which connects an inside of the liquid tank to the vessel via the filling head; providing a gas valve in a gas passageway connecting a headspace of the liquid tank to the vessel via the filling head; providing a snifting valve in a snifting passage which connects the vessel to an outside via the filling head; detecting an amount of the liquid supplied to the vessel; and when the liquid is a non-fizzy liquid, opening the liquid valve to supply the liquid to the vessel while a compressor pressurizes the inside of the liquid tank, the gas valve is closed, the snifting valve is opened, and the mouth of the vessel is sealed by the seal member.

BRIEF DESCRIPTION OF THE DRAWINGS

The objects and advantages of the present invention will be better understood from the following description with references to the accompanying drawings in which.

DESCRIPTION OF THE PREFERRED EMBODIMENTS

Figure 1:
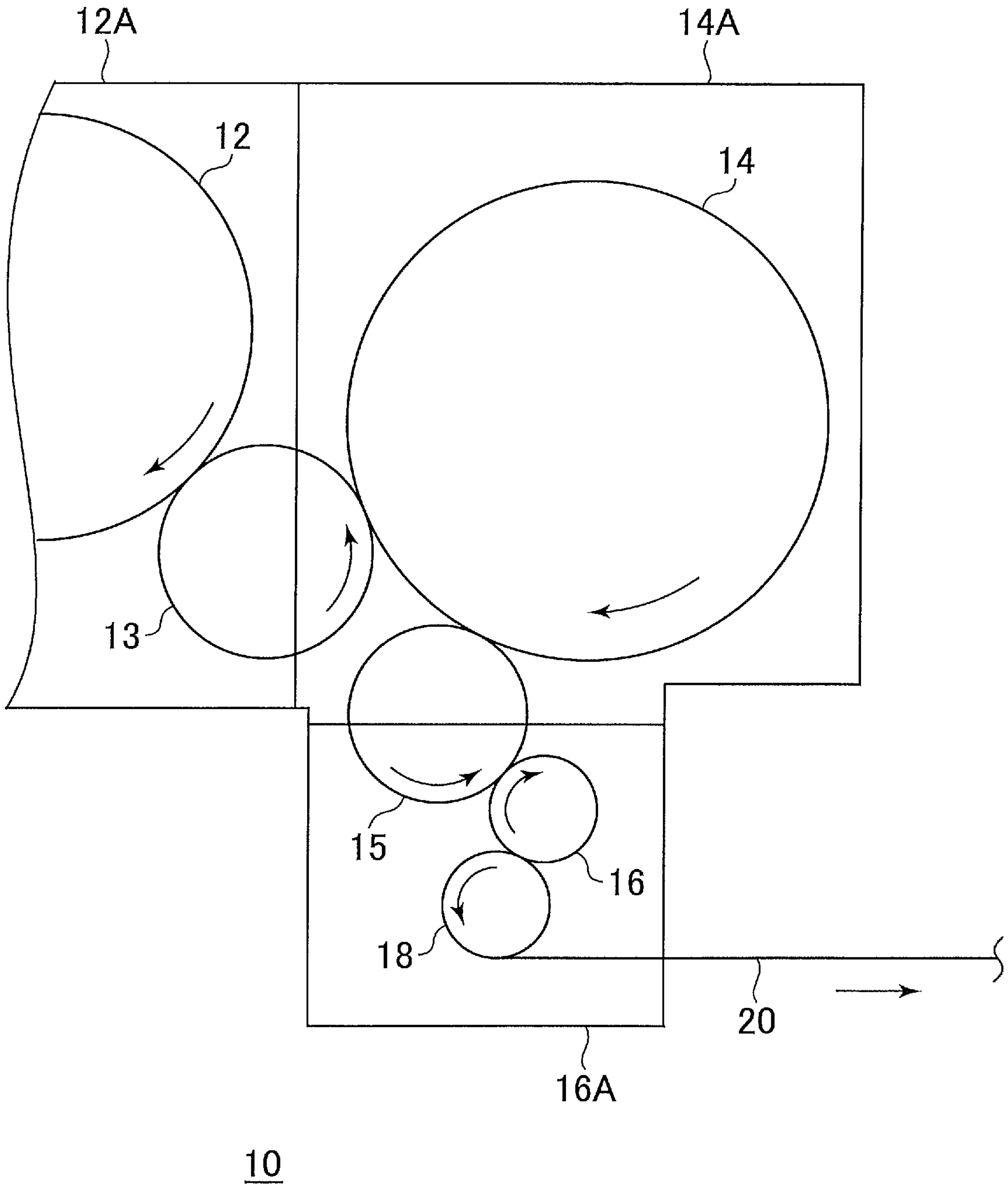
FIG. 1 is a plan view schematically illustrating a configuration of a part of a filling line of the first embodiment.

The embodiments of the present invention are described below with reference to the drawings. FIG. 1 is a plan view schematically illustrating a configuration of a part of a filling line of the first embodiment.

The filling line 10 of the first embodiment is a facility that is used to fill fizzy liquid containing dissolved gas (e.g., carbonated drinks) and non-fizzy liquid containing no gas (e.g., water which does not contain dissolved carbon dioxide) into a vessel V under sterile conditions. The filling line 10 includes a rotary-type rinser 12, a filling machine 14, and a capper 16. The rinser 12, the filling machine 14 and the capper 16 are each located inside sterile chambers 12A, 14A and 16A, respectively.

The vessels V, of which the insides and outsides were washed by the rinser 12 inside the sterile chamber 12A, are delivered to the filling machine 14 inside the sterile chamber 14A via a supply wheel 13. The filling machine 14 may fill either a fizzy liquid or non-fizzy liquid in the vessels V.

The vessels V that have been filled with a liquid are delivered to the capper 16 inside the sterile chamber 16A via an intermediate wheel 15 and capped. The vessels V that have been capped are then delivered to a discharge conveyor 20 via a discharge wheel 18 and discharged outside the sterile chamber 16A.

For example, the vessel V is a resin bottle having a flange portion or a transfer bead so that the upper and lower part of the flange portion are gripped by grippers on each wheel arranged for conveying the vessel V from the rinser 12 to the capper 16. Incidentally, from the discharge conveyor 20, the vessels V are conveyed with their base supported by the conveying surface.

Each of the sterile chambers 12A, 14A and 16A is partitioned to be hermetically separated from the outside. When a sterile filling process is carried out, the pressure inside each of the chambers is maintained at a predetermined value (e.g., about 0.005 MPa) that is higher than the external ambient pressure (e.g., the atmospheric pressure) by a pressure regulator (not shown).

Figure 2:
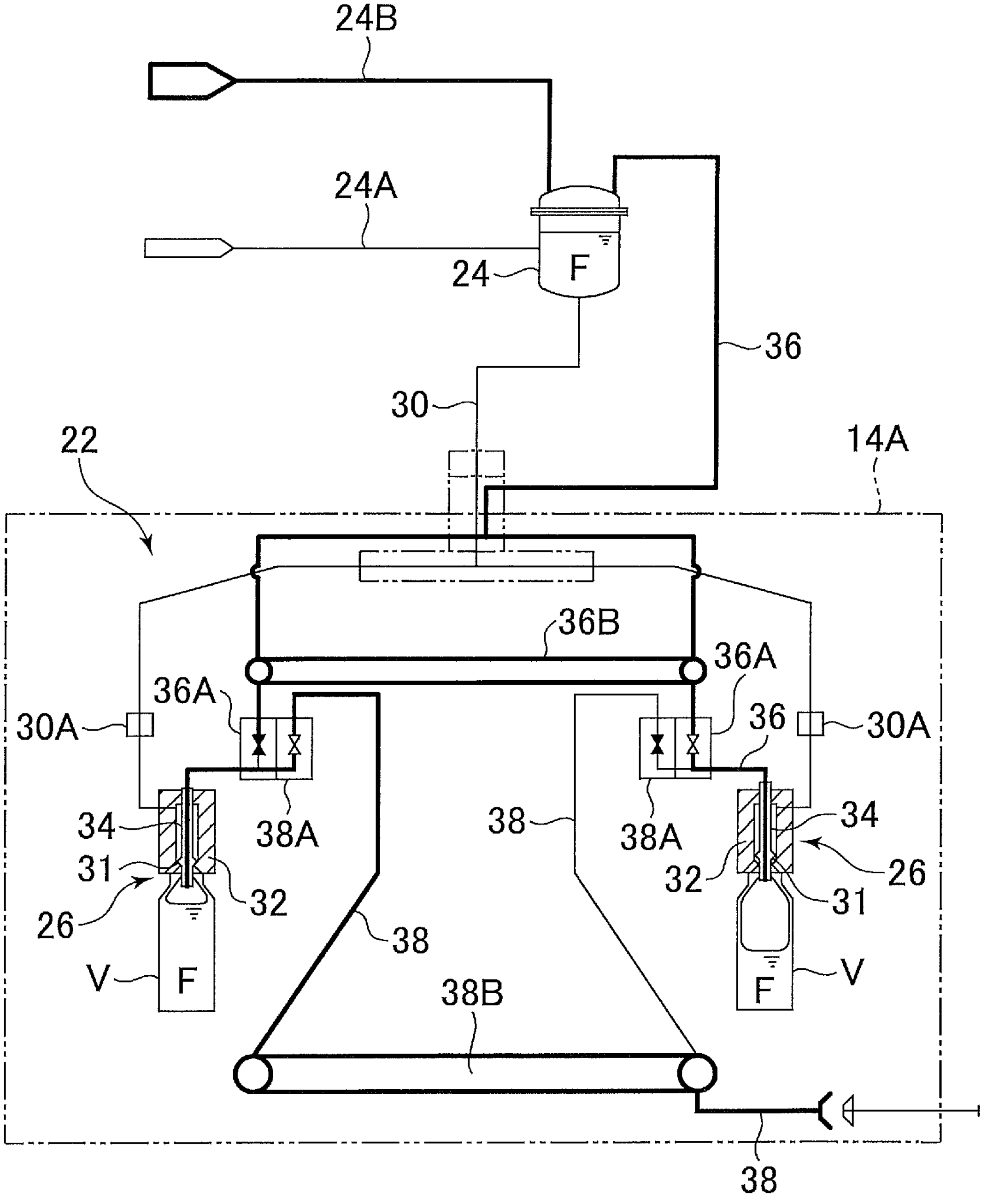
FIG. 2 is a side view schematically illustrating the configuration of the filling machine of the first embodiment when filling a fizzy liquid.
Figure 3:
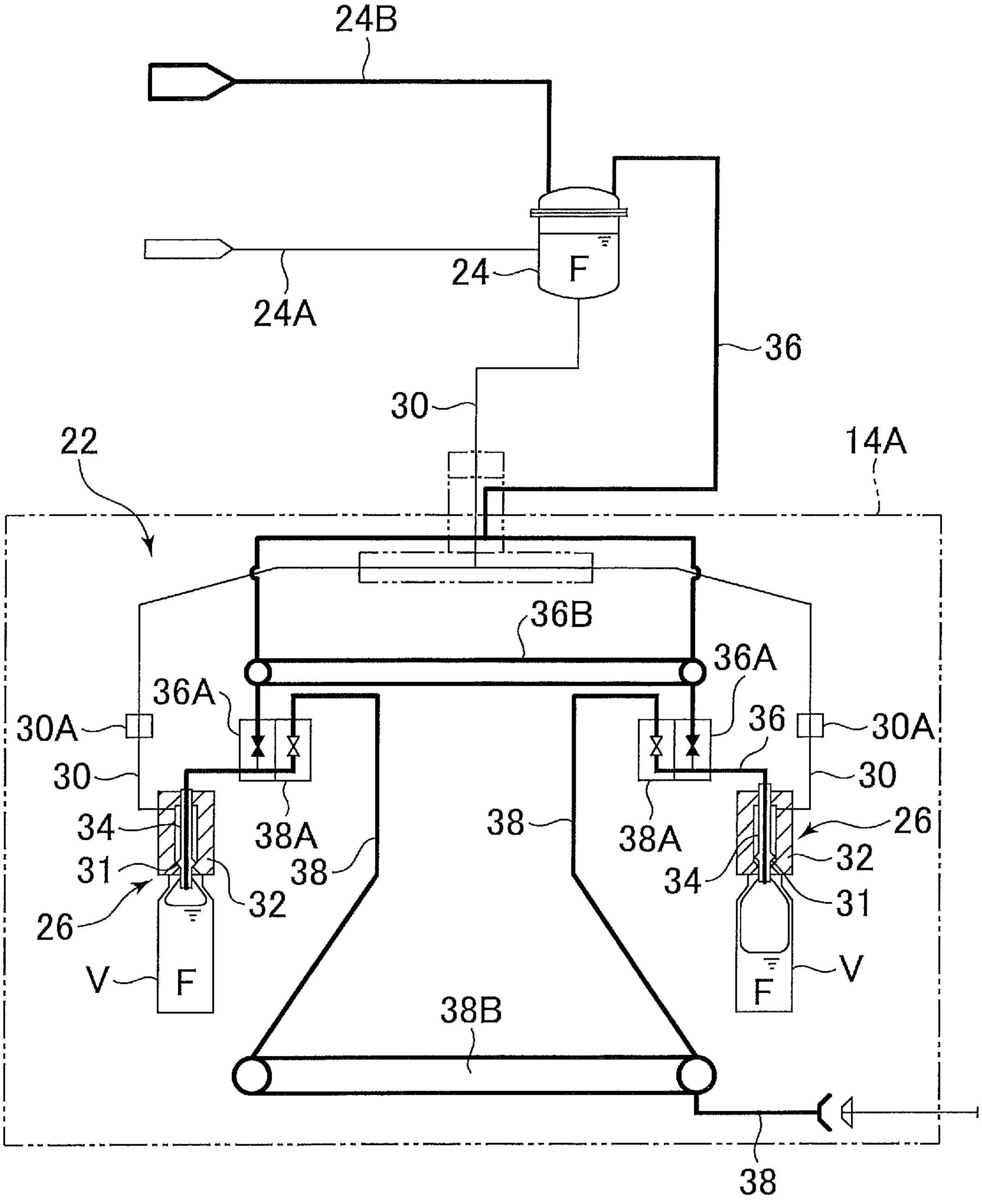
FIG. 3 is a side view schematically illustrating the configuration of the filling machine of the first embodiment when filing a non-fizzy liquid.

FIGS. 2 and 3 are side views schematically illustrating the configuration of the filling machine 14 of the present embodiment. FIG. 2 shows the state when filling a fizzy liquid and FIG. 3 shows the state when filing a non-fizzy liquid.

The filling machine 14 includes a main part 22 arranged inside the sterile chamber 14A and a liquid tank 24 located outside the sterile chamber 14A above the main part 22. The main part 22 of the filling machine 14 includes a rotary wheel and a plurality of filling heads 26 arranged along the circumference of the wheel. Furthermore, the rotary wheel is also provided with grippers 28 for holding the vessels V at the positions corresponding to each of the filling heads 26 (see FIG. 4).

Filling liquid F, either a fizzy liquid or non-fizzy liquid, is supplied to the liquid tank 24 through a liquid supply line 24A. A pressurized gas from the compressor (not shown) is supplied to the headspace of the liquid tank 24 through a gas supply line 24B. In the case of filling a fizzy liquid, a pressurized gas such as the carbon dioxide is supplied and the pressure inside the headspace of the liquid tank 24 is maintained, for example, at about 0.3 MPa. On the other hand, in the case of filling a non-fizzy liquid, the pressurized sterile air is supplied and the pressure inside the headspace of the liquid tank 24 is maintained, for example, at about 0.03 MPa.

A liquid passage 30 for supplying the filling liquid F to the filling heads 26 is connected to the bottom of the liquid tank 24. The liquid passage 30 is branched in the main part 22 of the filling machine 14 and the filling liquid F is supplied to each of the filling heads 26 via a flowmeter 30A, see FIG. 4. The filling head 26 hermetically contacts the mouth of the vessel V for supplying the filling liquid F to the vessel V. As detailed later with reference to FIG. 4, the filling head 26 includes a hollow nozzle body 32 configured by the outer shell of the filling head 26 and a valve rod 34 liftably provided inside the nozzle body 32. The liquid passageway 30 is defined between the valve rod 34 and the nozzle body 32. The valve rod 34 and the nozzle body 32 also configure a liquid valve 31 for opening and closing the liquid passageway 30. The filling head 26 injects the filling liquid F into the vessel V at a predetermined timing by opening and closing the liquid valve 31.

The valve rod 34 is provided with a gas passageway 36 for connecting the headspace inside the liquid tank 24 with the gas space of the vessel V sealed by the filling head 26. The gas passageways 36 from each of the filling heads 26 are connected to a gas manifold 36B via gas valves 36A and integrated into one gas passageway 36 connected to the top part of the liquid tank 24.

A snifting passage 38 is connected to the gas passageway 36 at a position between the filling head 26 and the gas valve 36A for connecting the space inside the sealed vessel V to an outer space such as the sterile chamber 14A. The snifting passage 38 connected to each of the gas passageways 36 is provided with a snifting valve 38A, respectively. The snifting passages 38 are integrated into one snifting passage 38 through a snifting manifold 38B and discharged into the sterile chamber 14A.

In FIGS. 2 and 3, an open valve is depicted by a white valve and a closed valve is depicted by a black valve. Furthermore, in each state, a passageway (or a portion thereof) supplied with a pressured gas is depicted by a thick line.

Figure 4:
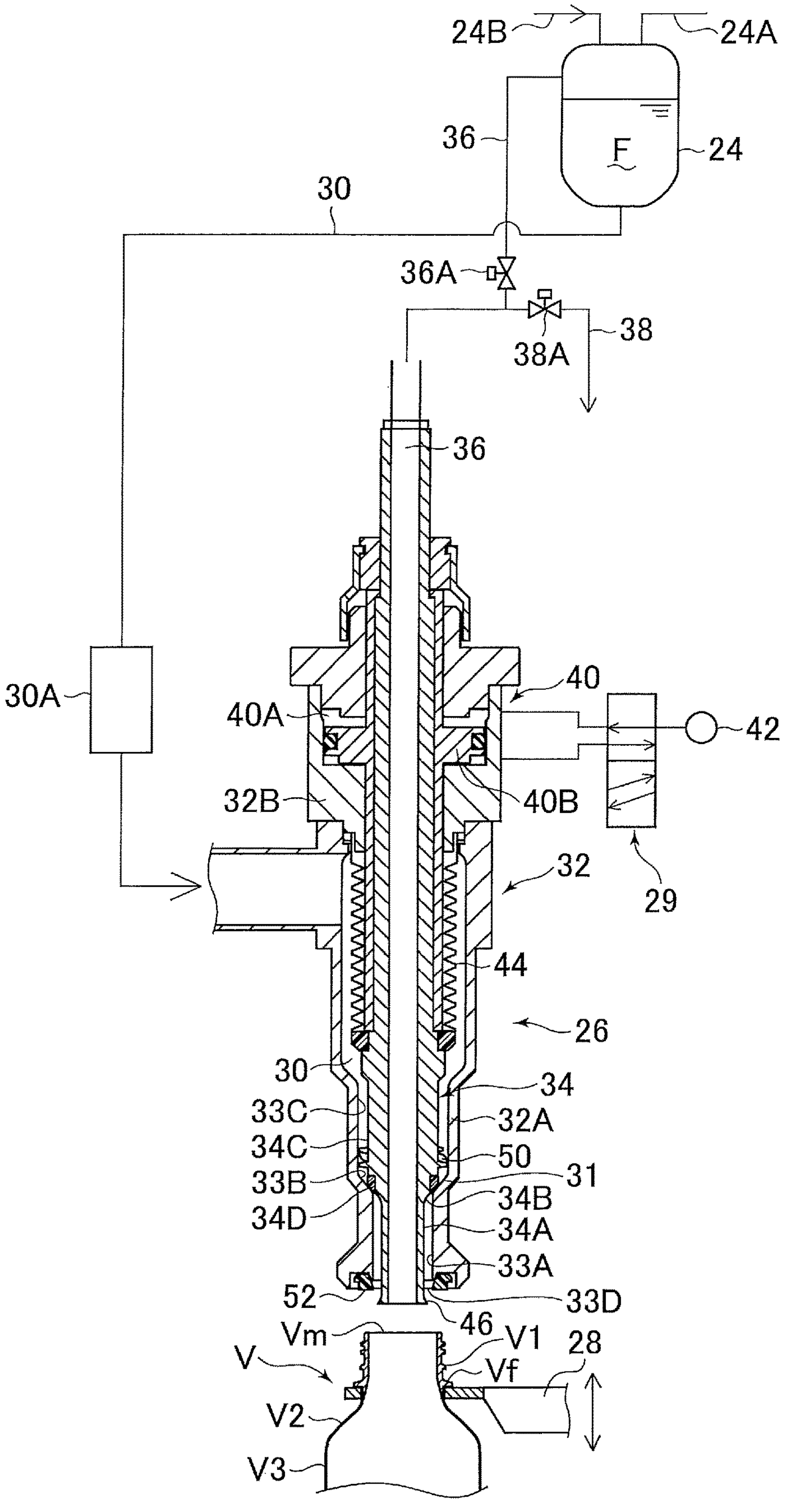
FIG. 4 is a side-sectional view illustrating the configuration of the filling head of the first embodiment.
Figure 5:
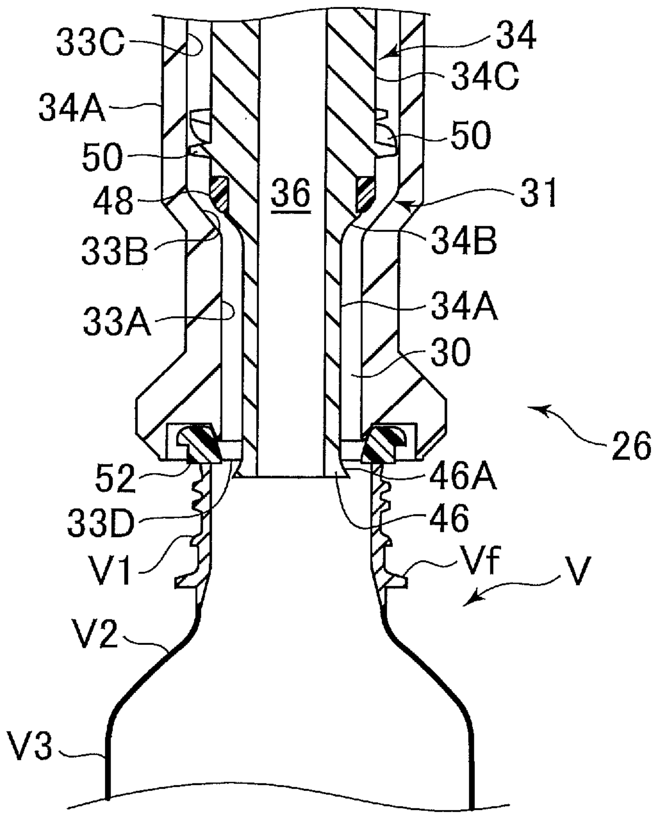
FIG. 5 is an enlarged side-sectional view of the filling head around the tip end portion.

FIG. 4 is a side-sectional view illustrating the configuration of the filling head 26. FIG. 5 is an enlarged side-sectional view of the filling head 26 around the tip end portion in FIG. 4. In FIG. 4, the filling head 26 is located above the vessel V at a predetermined distance and the liquid valve 31 of the liquid passageway 30 is closed. Furthermore, in FIG. 5, the tip end of the filling head 26 is pressed against the mouth of the vessel V and the vessel V is hermetically sealed.

The vessel V treated in the filling line 10 may be a resin bottle such as a PET bottle. However, the type of the vessel V varies according to whether a fizzy liquid or non-fizzy liquid is used as the filling liquid F. Namely, a pressure-resistant PET bottle may be adopted when a fizzy liquid is treated and a sterile filling PET bottle may be adopted when a non-fizzy liquid is treated.

The vessel V includes a cylindrical portion V1 formed with a mouth Vm at the top end, a shoulder portion V2 connected to the cylindrical portion V1 and a body portion V3 connected to the shoulder portion V2. The inner diameter of the mouth Vm and the cylindrical portion V1 is relatively rapidly enlarged to the inner diameter of the body portion V3 through the shoulder portion V2. A vessel V treated in the present embodiment is provided with the flange portion Vf on the periphery of the cylindrical portion V1. In the filling machine 14, the vessels V are gripped under the flange portion Vf by the gripper 28.

The filling head 26 includes the nozzle body 32 with an elongated hollow structure and the valve rod 34 that is liftably provided inside the nozzle body 32 along the hollow section. The nozzle body 32 includes a lower shell member 32A and an upper shell member 32B for lifting the valve rod 34. The liquid passageway 30 for supplying the filling liquid F to the filling head 26 is connected to an upper portion of the side surface of the lower shell member 32A.

Between the valve rod 34 and the lower shell member 32A, the annular liquid passageway 30 through which the filling liquid F flows is formed around the valve rod 34. The bottom end of the valve rod 34 slightly protrudes from the bottom end of the lower shell member 32A.

The gas passageway 36 is longitudinally provided within the valve rod 34 and as aforementioned, connects the vessel V to the headspace of the liquid tank 24 via the gas valve 36A and is also connected to the snifting passage 38, thereby connecting the vessel V to the sterile chamber 14A via the snifting valve 38A.

The valve rod 34 includes a first small-diameter portion 34A configuring the lower portion of the valve rod 34, a first large-diameter portion 34C located above the first small-diameter portion 34A, and a first tapered-diameter portion 33B connecting the first large-diameter portion 34C and the first small-diameter portion 34A. Inside the lower shell member 32A, a first shell small-diameter portion 33A, a first tapered-diameter portion 33B and a first large-diameter portion 33C are provided from bottom to top corresponding to the profile of the valve rod 34 to form the liquid passageway 30, and thereby the bottom end opening of the first shell small-diameter portion 33A is formed as an outlet 33D of the nozzle body 32.

The valve rod 34 is liftable inside the lower shell member 32A, whereby the first tapered-diameter portion 34B performs the function of a valve plug and the first shell tapered-diameter portion 33B performs the function of a valve seat. Namely, the inner diameter of the first shell small-diameter portion 33A is larger than the outer diameter of the first large-diameter portion 34C, whereby the first tapered-diameter portion 34B abuts against the first shell tapered-diameter portion 33B when the valve rod 34 is descended. Thereby, a ring seal member 34D provided on a peripheral portion from the bottom edge of the first large-diameter portion 34C to the first tapered-diameter portion 34B is pressed against the first shell tapered-diameter portion 33B, so that the liquid passageway 30 hermetically occludes.

The valve rod 34 is ascended and descended by an actuator 40 provided inside the upper shell member 32B. The actuator 40 may include a cylinder 40A formed inside the upper shell member 32B and a piston 40B provided on the valve rod 34, which engages with the cylinder 40A. The valve rod 34 is motivated by taking air in and out to or from spaces defined above and below the piston 40B inside the cylinder 40A, whereby the spaces are hermetically separated by the piston 40B. Air inflow and outflow to/from the space above and below the piston 40B is controlled by a selector valve 29 connected to an air compressor 42.

To isolate the liquid passage 30 from the actuator 40 of the valve rod 34, a corrugated tube or bellows 44 that freely expands and contracts in the vertical direction together with the vertical motion of the valve rod 34 is provided around the valve rod 34 inside the lower shell member 32A with its top end hermetically attached to the bottom end of the upper shell member 32B and its bottom end hermetically attached to the valve rod 34. Thereby, the liquid passageway 30 is separated from a sliding portion between the upper shell member 32B and the valve rod 34.

As mentioned above, the gas passageway 36 formed inside the valve rod 34 is connectable to the headspace of the liquid tank 24 via the gas valve 36A and communicable with the sterile chamber 14A via the snifting valve 38A.

A flare portion 46, which extends radially outward toward the bottom, is provided at the bottom end of the valve rod 34. Thereby, an inclined surface 46A is formed around the periphery of the bottom end of the first small-diameter portion 34A. Furthermore, a plurality of swirl vanes 50, which have a helically form, is provided on the periphery of the first large-diameter portion 34C above the seal member 34D attached in the vicinity of the first tapered-diameter portion 34B. The external dimensions of the swirl vanes 50 are about the same size as the inner diameter of the first shell large-diameter portion 33C of the lower shell member 32A and thereby helical channels are configured by the outer peripheral surface of the first large-diameter portion 34C, the swirl vanes 50 and the inner peripheral surface of the first shell large-diameter portion 33C. Incidentally, the periphery of the outlet 33D formed at the bottom end of the lower shell member 32A is provided with a ring seal member 52 that is pressed onto the mouth Vm of the vessel V during the filling process to seal the mouth Vm.

With reference to FIGS. 2-5, the filling process carried out by the filling machine 14 of the present embodiment is explained.

The filling machine 14 includes a first filling mode for filling a fizzy liquid and a second filling mode for filling a non-fizzy liquid. Both modes are performed by switching between opening and closing the gas valve 36A and the snifting valve 38A. FIG. 2 illustrates the filling process in the first filling mode and FIG. 3 illustrates the filing process in the second filling mode. Note that the operation of the filling head 26 is the same in both the first filling mode and second filling mode.

FIG. 4 illustrates a state when the valve rod 34 is lowered by the actuator 40 to close the liquid valve 31. FIG. 5 illustrates a state when the filling liquid F is filled into the vessel V via the filling head 26. Namely, in FIG. 5, the mouth Vm of the vessel V is pressed against the seal member 52 provided on the bottom end of the filling head 26 and the first tapered-diameter portion 34B is separated from the first shell tapered-diameter portion 33B so that the liquid valve 31 is in the open state.

When the liquid valve 31 is open, the flare portion 46 at the bottom end of the valve rod 34 protrudes from the outlet 33D at the bottom end of the lower shell member 32A and is positioned inside the cylindrical portion V1 of the vessel V. In the present embodiment, a spread angle θ of the flare portion 46, which is defined as the angle between the tangent of the inclined surface 46A in the radial direction at the peripheral and the downward axial direction of the small-diameter member 34A, is about 60 degrees. Incidentally, when the valve rod 34 is arranged at the opening position of the valve, the position of the upper end where the inclined surface 46A of the flare portion 46 begins to spread is substantially the same level as the position of the upper end of the mouth portion Vm of the vessel V.

Just before the filling operation is started, the filling head 26 is closed and maintained in the state illustrated in FIG. 4. Namely, the valve rod 34 is lowered by the actuator 40 and the seal member 48 of the tapered-diameter portion 34B is pressed against the first shell tapered-diameter portion 33B so that the liquid passageway 30 is closed.

At the start of the filling operation when the vessel V is delivered to the filling machine 14, the gripper 28 is lifted and as illustrated in FIG. 5, the mouth Vm of the vessel V held by the gripper 28 is pressed against the seal member 52 provided on the bottom end of the lower shell member 32 A. Thereby, the vessel V is hermetically isolated from the surrounding atmosphere and sealed.

When the mouth Vm of the vessel V is pressed against the filling head 26, the valve rod 34 is lifted by the actuator 40 and the liquid valve 31 is opened. In the first filling mode, the gas valve 36A is opened and the snifting valve 38A is closed before the liquid valve 31 is opened. The liquid valve 31 is opened after the pressure inside the vessel V equalizes with the pressure inside the headspace of the liquid tank 24. This condition is maintained while the liquid valve 31 is open. Thereby, the filling liquid F inside the pressurized liquid tank 24 is injected into the vessel V through the liquid passageway 30 and the gas inside the vessel V flows into the headspace of the liquid tank 24 through the gas passageway 36. Incidentally, illustrated on the right side of FIG. 2 is the situation of the filling operation being carried out in the first filling mode (where the filling liquid F is half filled in the vessel V.)

When the liquid valve 31 is opened, the filling liquid F inside the liquid tank 24 flows through the liquid passageway 30. When the valve rod 34 is lifted to the upper limit position by the actuator 40, the flare portion 46 on the bottom end of the valve rod 34 reaches the position where the top end of the inclined surface 46A reaches about the same level as the outlet 33D, as illustrated in FIG. 5. The filling liquid F that flows down through the liquid passageway 30 is given a tangential flow component by the spiral flow passage configured by the swirl vanes 50. Thereby, the filling liquid F spirally flows down the liquid passageway 30 formed between the outer periphery of the first tapered-diameter portion 34B of the valve rod 34 and the inner periphery of the first shell tapered-diameter portion 33B of the lower shell member 32A.

When the filling liquid F reaches the outlet 33D, the filling liquid F is spread radially outward from the valve rod 34 with the tangential flow component due to the centrifugal force of the spiral flow and with the aid of the expanded area of the inclined surface 40A of the flare portion 46 so that the filling liquid F is sprayed on the inner surface of the cylindrical portion V1 of the vessel V. At the beginning of the filling operation, the centrifugal force of the spiral flow induced by the swirl vanes 50 is not sufficient. Therefore, at this moment, the filling liquid F is guided to the inner surface of the cylindrical portion V1 via the inclined surface 46A of the flare portion 46 as well as the spiral effect of the filling liquid F. However, once the spiral flow is sufficiently developed, the spiral effect by itself is enough to guide the filling liquid F to the inner surface of the cylindrical portion V1.

The filling operation is performed while the rotary wheel of the filling machine 14 is rotated. On the left side of FIG. 2 is illustrated the condition when the filling operation is completed. The amount of the filling liquid F supplied to each of the filling heads 26 is measured by the flowmeter 30A and the valve rod 34 is descended by the actuator 40 to close the liquid valve 31 when the amount of the filling liquid F supplied to the vessel V reaches a predetermined amount. The gas valve 36A is then closed and the snifting valve 38A is opened so that the pressure inside the vessel V adapts to the pressure inside the sterile chamber 14A (outside pressure.) Then, the vessel V is lowered by the gripper 28 and the mouth portion Vm of the vessel V is released from the filling head 26.

On the other hand, in the second filling mode in which a non-fizzy liquid is filled, the gas valve 36A is closed while the snifting valve 38A is opened and the liquid valve 31 is opened, as illustrated on the right side of FIG. 3. The open and closed conditions of the gas valve 36A and the snifting valve 38A are maintained during the filling operation of the second filling mode. Namely, the vessel V is disconnected from the headspace of the liquid tank 24, but connected to the sterile chamber 14A through the snifting passage 38 at all times. When the filling liquid F is injected into the vessel V, the air inside the vessel V is discharged to the sterile chamber 14A through the snifting passage 38.

Note that the operation of the valve rod 34 and the flow of the filling liquid F are the same as that of the first filling mode.

As described above, according to the filling system of the first embodiment, the pressure inside the vessel can be maintained at approximately the same level as the outside pressure while filling a non-fizzy liquid with the liquid tank pressurized higher than the outside pressure so that the deformation of the vessel is prevented even when a pliable vessel is used. Accordingly, the system can be used for both a fizzy liquid and non-fizzy liquid even when pressurized filling is required for filling a non-fizzy liquid as in the sterile filling.

Figure 6:
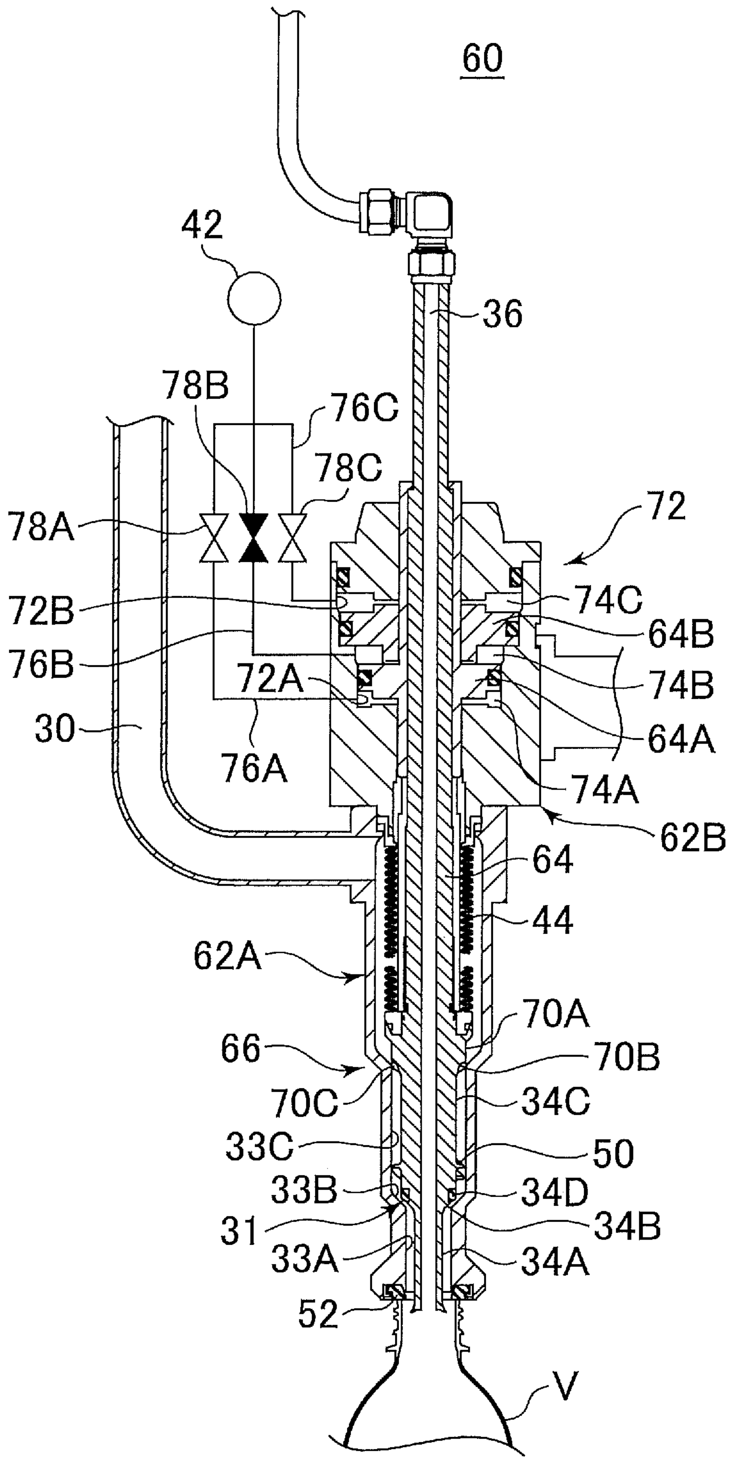
FIG. 6 is a side sectional view of a filling head of a second embodiment.
Figure 7:
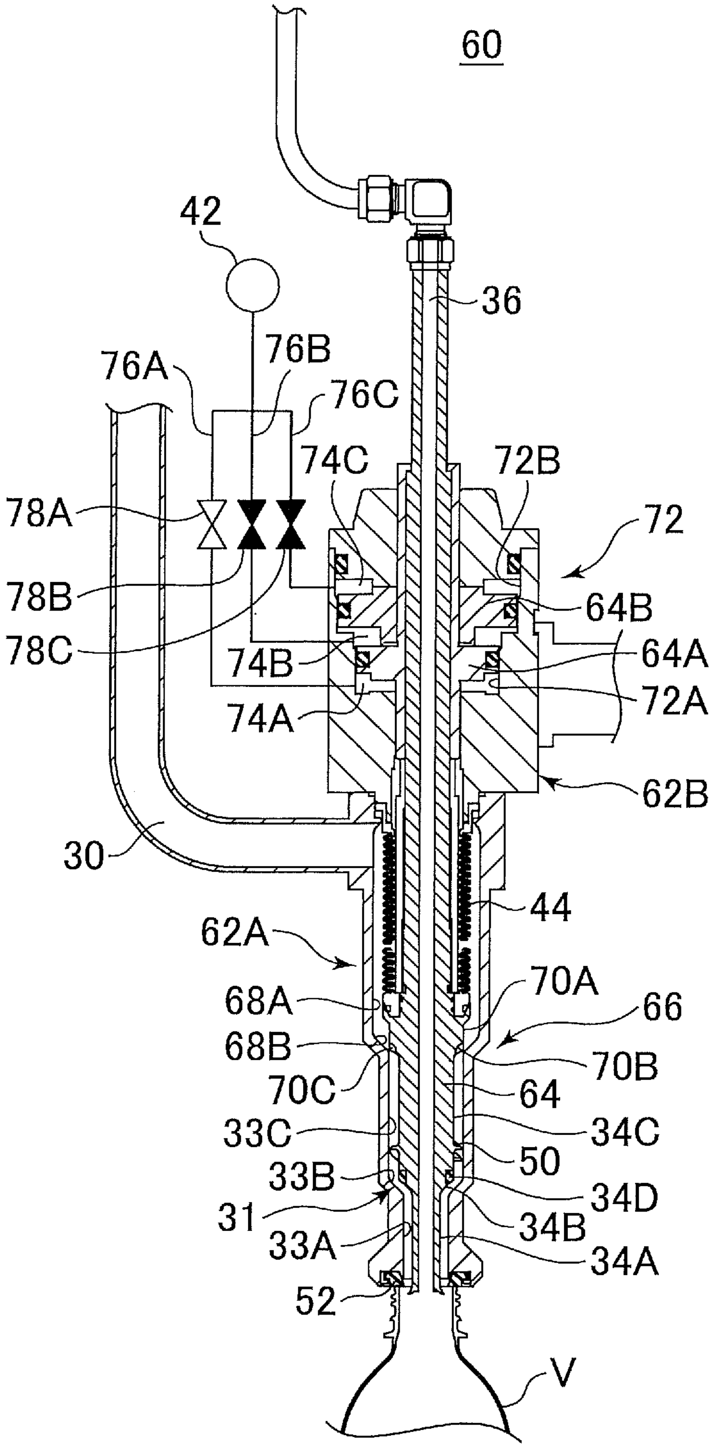
FIG. 7 is a side sectional view of a filling head of a second embodiment.

FIG. 6 and FIG. 7 are side sectional views of a filling head of a second embodiment. With reference to FIGS. 6 and 7, the configuration of the filling head of the second embodiment is explained.

The filling head 60 in the filling system of the second embodiment is able to open the liquid passageway 30 at two different settings of opening degrees. For example, a large opening degree is selected when filling a fizzy liquid and a small opening degree is selected when filling a non-fizzy liquid. The other structures are the same as those of the first embodiment so that for the same components the same reference numerals have been adopted and their explanations omitted. FIG. 6 illustrates the filling head 60 with the small opening degree and FIG. 7 illustrates the filling head 60 with the large opening degree.

The filling head 60 includes an upper shell member 62B, which is used to raise and lower a valve rod 64 and a lower shell member 62A. Similar to the filling head 26 of the first embodiment, the filling head 60 includes the liquid valve 31, which is comprised of the lower shell member 62A and the valve rod 64. The valve rod 64 is provided with swirl vanes 50 above the liquid valve 31. Furthermore, above the swirl vanes 50, a flow control portion 66 is provided for reducing the flow speed of the liquid passing through the liquid passageway 30 by narrowing the liquid passageway 30 by the valve rod 64 lifted inside the lower shell member 62A.

Above the first shell large-diameter portion 33C, the lower shell member 62A is provided with a second shell large-diameter portion 68A having a larger inner diameter than the first shell large-diameter portion 33C and a second shell tapered-diameter portion 68B connecting the second shell large-diameter portion 68A and the first shell large-diameter portion 33C. Further, above the first large-diameter portion 34C, the valve rod 64 is provided with a second large-diameter portion 70A having a larger outer diameter than the first large-diameter portion 34C and a second tapered-diameter portion 70B connecting the second large-diameter portion 70A and the first large-diameter portion 34C.

The second tapered-diameter portion 70B is located at the same level as the second shell tapered-diameter portion 68B. The outer diameter of the second large-diameter portion 70A is configured so that it is slidable inside the first large-diameter portion 33C. Furthermore, a plurality of grooves 70C along the vertical direction is provided around the second tapered-diameter portion 70B.

The valve rod 64 is vertically moved by an actuator 72 provided inside the upper shell member 62B. The actuator 72, for example, includes cylinders 72A and 72B formed inside the upper shell member 62B and pistons 64A and 64B provided on the valve rod 64 that engage with the cylinders 72A and 72B, respectively. The cylinder 72A and the cylinder 72B are formed as one space vertically connected together with the inner diameter of cylinder 72A smaller than that of cylinder 72B. Namely, the outer diameter of the piston 64A is smaller than that of the piston 64B.

The cylinder 70A is vertically divided in two parts hermetically by the piston 64A. Furthermore, the cylinder 72B is vertically divided in two parts hermetically by the piston 64B. Thereby, the pistons 64A and 64B divide the space inside the cylinders 72A and 72B in three spaces 74A, 74B and 74C from the bottom. The spaces 74A, 74B and 74C are connected to the air compressor 42 through air supply tubes 76A, 76B and 76C, respectively, and the air supply tubes 76A, 76B and 76C are each provided with valves 78A, 78B and 78C.

When the liquid valve 31 provided in the liquid passage 30 is opened at the large degree, only valve 78A is opened and valves 78B and 78C are closed. Thereby, as illustrated in FIG. 7, the valve rod 64 is lifted to the upper limit (the third height) so that the liquid valve 31 and the flow control portion 66 are opened wide. Namely, the filling head 60 is set at the large opening degree.

When the liquid valve 31 provided in the liquid passageway 30 is opened at the small degree, valves 78A and 78C are opened and valve 78B is closed. Thereby, as illustrated in FIG. 6, the piston 64B presses down the piston 64A from the state illustrated in FIG. 7 so that the valve rod 64 is slightly lowered (the second height) and thereby the opening degree of the liquid valve 31 is reduced. Accordingly, the filling head 60 is set at the small opening degree. At this time, the bottom part of the second tapered-diameter portion 70B fits into the top part of the first shell large-diameter portion 33C and the filling liquid F flows between the grooves 70C provided around the second tapered-diameter portion 70B at the flow control portion 66 so that the speed of the filling liquid F is suppressed.

When the liquid valve 31 provided in the liquid passageway 30 is closed, only the valve 78B is opened and valves 78A and 78C are closed. Thereby, the valve rod 64 is lowered to the lower limit (the first height) so that the bottom end of the second large-diameter portion 70A is slightly inserted into the first shell large-diameter portion 33C and the seal member 34D at the first tapered-diameter portion 34B is pressed against the first shell tapered-diameter portion 33B to close the liquid passageway 30.

As described above, according to the second embodiment, the same effect as the first embodiment is also obtained. In addition, the filling rate can be adjusted according to the type of filling liquid. For example, when filling a non-fizzy liquid into the vessel, the gas passageway, which connects the vessel to the liquid tank, is closed and the snifting passage is opened to the sterile chamber 14A. Thereby, a flow rate of the filling liquid is accelerated by the difference between the pressure inside the liquid tank (e.g., 0.03 MPa) and the pressure inside the sterile chamber (e.g., 0.005 MPa.) In the second embodiment, the flow rate is suppressed by opening the liquid valve 31 at the small degree when filling a fizzy non-carbonated drink into the vessel so that the filling liquid is prevented from bubbling in the vessel. Furthermore, when a carbonated drink is filled into the vessel, the liquid valve 31 can be opened at the large degree so that the opening degree of the liquid valve 31 can be selected according to the type of liquid filled into the vessel.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2020-025650 (filed on Feb. 18, 2020), which is expressly incorporated herein, by reference, in its entirety.

The invention claimed is:

1. A filling method comprising:
- storing liquid in a liquid tank;
- pressing a seal member of a filling head against a mouth of a vessel to seal the mouth of the vessel by the seal member;
- providing a liquid valve in a liquid passageway which connects an inside of the liquid tank to the vessel via the filling head;
- providing a gas valve in a gas passageway connecting a headspace of the liquid tank to the vessel via the filling head;
- providing a snifting valve in a snifting passage which connects the vessel to an outside via the filling head;
- detecting an amount of the liquid supplied to the vessel; and
- when the liquid is a non-fizzy liquid, opening the liquid valve to supply the liquid to the vessel while a compressor pressurizes the inside of the liquid tank, while the gas valve is closed, while the snifting valve is opened, and while the mouth of the vessel is sealed by the seal member.

2. The filling method according to claim 1, wherein when the liquid is a fizzy liquid, the liquid valve is opened to allow the liquid to fill the vessel while the liquid tank is pressurized, the gas valve is opened and the snifting valve is closed until the liquid filling is completed, at which point the snifting valve is opened.

3. The filling method according to claim 1, wherein the filling head is located inside a sterile chamber and the snifting passage is opened to the sterile chamber.

4. The filling method according to claim 3, wherein the compressor is adapted to regulate the pressure inside the liquid tank when filling either a fizzy liquid, for which the pressure in the liquid tank is set at a relatively higher pressure than a pressure set for filling a non-fizzy liquid, or filling a non-fizzy liquid, for which the pressure in the liquid tank is set at a pressure relatively higher than the sterile chamber.

5. The filling method according to claim 1, wherein
- the filling head comprises a hollowed nozzle body and a valve rod liftably provided inside the nozzle body;
- the liquid passageway is provided between an inner surface of the nozzle body and an outer surface of the valve rod, and an outlet of the liquid passageway is provided at a bottom end of the nozzle body;
- a swirl vane, which is provided on the outer surface of the valve rod, exerts a spiral force on a flow passing through the liquid passageway; and
- the liquid valve comprises a valve seat provided on the inner surface of the nozzle body and a plug provided on the outer surface of the valve rod so that the liquid valve is opened and closed by an actuator raising and lowering the valve rod.

6. The filling method according to claim 5, wherein the actuator is configured to control the position of the plug so that the opening degree of the liquid valve is selectable between a large opening degree and a small opening degree; the large opening degree is selected when filling a fizzy liquid and the small opening degree is selected when filling a non-fizzy liquid.

7. A filling method comprising:
- storing non-fizzy liquid in a liquid tank;
- pressurizing an inside of the liquid tank;
- pressing a seal member of a filling head against a mouth of a vessel to seal the mouth of the vessel by the seal member;
- closing a gas valve provided in a gas passageway connecting a headspace of the liquid tank to the vessel via the filling head;
- opening a snifting valve provided in a snifting passage which connects the vessel to an outside via the filling head; and
- opening a liquid valve to supply the non-fizzy liquid to the vessel while a compressor pressurizes the inside of the liquid tank, while the gas valve is closed, while the snifting valve is opened, and while the mouth of the vessel is sealed by the seal member, the liquid valve being provided in a liquid passageway which connects the inside of the liquid tank to the vessel via the filling head.

* * * * *